Figure 1:
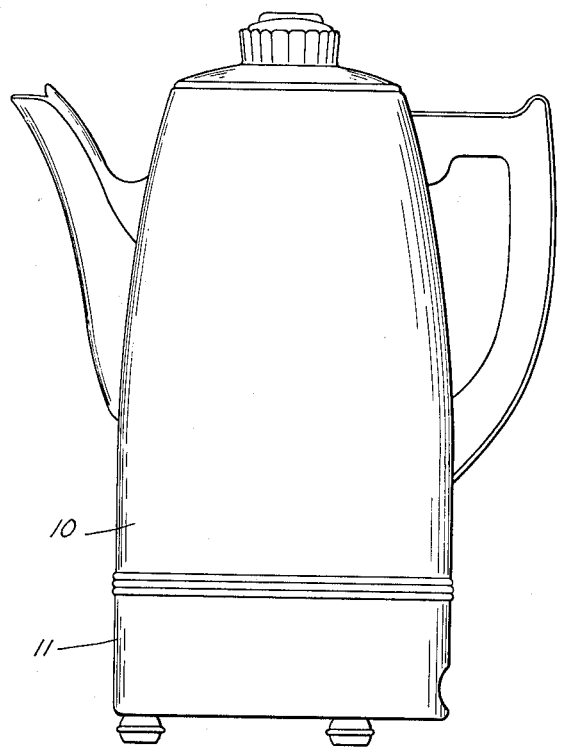

Dec. 13, 1955  P. J. KIRCHER  2,726,607
COFFEE MAKER
Filed June 7, 1951

Inventor
PAUL J. KIRCHER
By
Lindsey and Pritzman
Attorneys

United States Patent Office 2,726,607
Patented Dec. 13, 1955

2,726,607

COFFEE MAKER

Paul J. Kircher, Plainville, Conn., assignor to Landers, Frary & Clark, New Britain, Conn., a corporation of Connecticut Application June 7, 1951, Serial No. 230,373

1 Claim. (Cl. 103—231.5)

The present invention relates generally to coffee makers and more particularly to coffee makers of the electrically heated percolator type.

One object of the present invention is to provide an electrical percolator type coffee maker having improved operating characteristics and which employs elements characterized by their simplicity and which are simply and compactly arranged.

Another object of the invention is to provide an electric coffee maker which features a novel vessel construction having provision for receiving the heating unit and electrical connectors therefor in a manner which permits no leakage of liquid from the vessel to the heating and electrical elements and which by its construction may be easily and completely cleaned upon disassembly of the fountain and pump elements.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claim.

Figure 2:
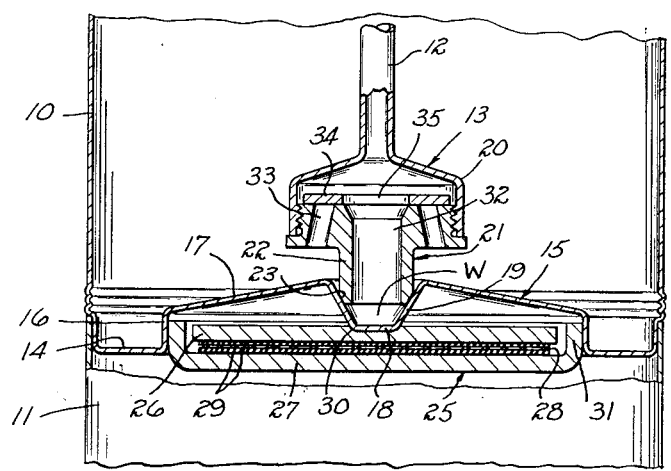

In the drawings:

Fig. 1 is a side elevational view of one form of an electric percolator embodying the present invention; and Fig. 2 is an enlarged fragmentary view in cross section of the heating and pump elements employed in the percolator.

The present illustrative embodiment comprises an electric type percolator having a main body or vessel 10 which is to contain the brew and to the bottom of which is fixed a false bottom or compartment 11 which houses the heating unit and electrical connecting means therefor.

A conventional basket (not shown) is supported by a fountain tube 12 within the vessel 10 and a pump unit 13 is associated with the fountain tube 12 adjacent the lower end thereof to circulate water or brew from the vessel 10 through the fountain tube in a manner to be described in greater detail later.

The vessel 10 has a sheet metal bottom 14 formed integrally with the generally cylindrical side walls of the vessel by a drawing operation, for example. It will be noted that the bottom 14 is formed without apertures or seams so as to provide a watertight compartment within the vessel 10.

The bottom is formed with a central raised portion 15 having a generally cylindrical peripheral wall 16 and an upwardly and inwardly tapering top wall 17. The center portion of the tapering wall 17 is pressed downwardly to define a frusto-conically shaped relatively shallow and open seat W having a bottom wall 18 and an upwardly and outwardly diverging side wall 19.

As previously mentioned, the pump 13 is associated with the lower end of the fountain tube 12. In the present instance, the pump 13 comprises a hood 20 integrally formed on the bottom of the fountain tube 12 so as to cover and support a valve 21. The valve has a vertically bored shank or stem 22 depending therefrom which is nested within the downwardly pressed center portion W and in cooperation therewith forms a well centrally of the vessel bottom 14. To facilitate disposition of the valve shank 22 within the seat W, the lower edge 23 of the shank is tapered to cooperate with the tapered side wall 19 of the seat.

On the opposite or lower side of the vessel bottom 14, a heating unit, designated generally by the reference numeral 25, is disposed. The heating unit 25 comprises upper and lower heat conducting plates 26 and 27, respectively, separated by an electrical grid 28 which is sandwiched between mica sheets 29 in a conventional manner and which is connected to an electrical system by conventional means not shown. The uppermost conductor 26 is a disk-like metallic plate having a centrally disposed depression 30 on its upper surface which closely receives the bottom wall 18 of the seat W. The arrangement of the depression 30 in the plate 26 to cooperate with the bottom wall 18 serves two purposes, first, to conduct heat from the plate 26 to the wall 18 and, second, to locate the plate 26 and heating unit 25 relative to the bottom wall 14 of the vessel 10. The plate 26 concentrates the heat received from the grid 28 at the bottom wall of the well since it is spaced from the bottom wall of the vessel at all other points, particularly by the air space between the tapered wall 17 of the raised portion of the vessel bottom and the plate 26, to prevent direct heat transfer from the plate to the vessel bottom.

The lower plate 27 is generally cup-shaped having an upwardly directed skirt 31 which engages the inner surface of the generally cylindrical peripheral wall 16 in the raised portion 15 formed in the vessel bottom. The heating unit 25 is assembled within the false bottom 11 by locating the well seat within the depression 30, and at the same time press-fitting the lower plate 27 within the raised portion 15, thus permitting the assembly of the heating unit without additional securing and retaining means.

Referring now more specifically to the pump 13, it will be seen that the valve 21 has a central channel 32 forming a well in combination with seat W and circumferentially spaced channels 33 in communication with the interior of the vessel 10. In accordance with conventional practice, a ring 34 is loosely disposed within the hood 20 to normally seat on the valve 21 so as to close the circumferentially spaced apertures 33. The ring 34, of course, has a central aperture 35 which provides an open passage between the valve channel 32 and the fountain tube 12.

In the operation of the aforedescribed percolator, the vessel 10 is initially supplied with the desired amount of water, a portion of which enters the pump 13 through the valve aperture 33, unseating the ring 34, so that a column of water within the fountain tube 12 stands to the level of the water within the vessel 10. When the fountain tube is thus supplied with water, the well formed by valve channel 32 and the seat W is also filled with water. The bottom of the seat W provides a hot point due to the heat concentration from plate 26 to partially vaporize the water within the well and cause a surge of steam upwardly in the fountain tube 12 in the well known percolating action. Part of the column of water in the fountain tube surges upwardly with the steam to spray over the contents of the basket. Thus, the liquid pressure within the fountain tube and pump is reduced and additional water enters the pump in the previously described manner and the heating and percolating process is repeated.

The water ejected at the top of the fountain tube and sprayed over the coffee grounds within the basket flows back into the vessel 10 forming the brew therein. The frequency of the heating and percolating action increases as the temperature of the water or brew admitted to the pump increases. The lower plate 27 transmits most of its heat to the outer regions of the vessel 10 through the peripheral walls 16 of the raised section of the vessel bottom. Thus, the overall temperature of the water or brew within the vessel is increased by the heating unit 25, and due to the increased overall temperature, the frequency of the percloating action is increased so that the brew will reach the desired strength and temperature in less time than is ordinarily needed.

It should be understood in this connection that it is desirable to start the circulating action of the water through the basket as soon as the water has been placed in the vessel. The present construction greatly facilitates the initial circulating action because of the arrangement of the heating unit and the vessel bottom which provides a hot point or flash point for a well which carries a relatively small volume of liquid. The temperature of this small volume of liquid can be rapidly brought to the boiling or vaporizing point to initiate the percolating action within the fountain.

The unique construction of the vessel having an integrally formed closed bottom ensures against leakage of water or brew into the heating and electrical elements. In addition, the construction of the bottom wall of the vessel facilitates assembly of the pump and fountain tube therein since it is only necessary to locate the tapered end of the valve shank within the wide-mouthed frusto conical seat defined in the bottom wall. Another advantage of this construction resides in the fact that the vessel and its bottom wall can be easily and completely cleaned upon removal of the fountain and pump. The wide-mouthed and relatively shallow construction of the seat W permits one to thoroughly clean the seat and the entire bottom of the vessel can be as thoroughly cleaned since no dirt collecting seams or cracks are presented.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claim is intended to cover all of the generic and specific features of the invention herein described and all statements of the scope of the invention which, as a matter of language, might be said to fall therebetween.

I claim as my invention:

In a coffee maker of the percolator type, a vessel having an imperforate sheet metal bottom contoured to form a shallow and wide-mouthed frusto-conical seat comprising a bottom wall and an outwardly flared side wall defining an entranceway to the seat at its upper end of substantially greater size than the said bottom wall, a removable fountain tube, an enlarged pump housing on the lower end of the tube and communicating therewith having a downwardly facing opening, a removable pump disposed in said downwardly facing opening comprising an apertured closure member threadably received in the said downwardly facing opening, a movable disc in the pump housing overlying the apertured closure member and an integral open-ended tubular stem depending downwardly from the closure member, said tubular stem being of smaller diameter than the said entranceway to the seat and of greater diameter than the bottom wall of the seat so as to rest upon the said flared side wall intermediate the bottom wall and the upper end of the side wall, the lower end of the tubular stem being chamfered to form a sealing engagement with the side wall, and electrical heating means secured to the bottom wall of the frusto-conical seat.

References Cited in the file of this patent

UNITED STATES PATENTS

| | | |
|---|---|---|
| 893,209 | Warner | July 14, 1908 |
| 965,449 | Gale | July 26, 1910 |
| 1,160,684 | Ball | Nov. 16, 1915 |
| 1,175,858 | Wojidkow | Mar. 14, 1916 |
| 1,309,374 | Swan | July 8, 1919 |
| 1,536,094 | Hadaway | May 5, 1925 |
| 1,719,473 | Hron | July 2, 1929 |
| 1,778,926 | Wiegand | Oct. 21, 1930 |
| 1,905,111 | Lamb | Apr. 25, 1933 |
| 1,971,758 | Olds | Aug. 28, 1934 |
| 2,548,647 | Blewett | Apr. 10, 1951 |